US008927097B2

(12) United States Patent
Mune

(10) Patent No.: US 8,927,097 B2
(45) Date of Patent: Jan. 6, 2015

(54) MICRO-ENGINEERED POLY-FIBER GEO-COMPOSITE ARTICLES AND METHODS OF MANUFACTURING THE SAME

(71) Applicant: PEBA Trading & Manufacturing Corporation, Lapu-Lapu, Cebu (PH)

(72) Inventor: David R. Mune, Lapu Lapu (PH)

(73) Assignee: PEBA Trading & Manufacturing Corporation, Lapu-lapu, Cebu (PH)

( * ) Notice: Subject to any disclaimer, the term of this patent is extended or adjusted under 35 U.S.C. 154(b) by 0 days.

(21) Appl. No.: 13/848,025

(22) Filed: Mar. 20, 2013

(65) Prior Publication Data

US 2014/0004329 A1 Jan. 2, 2014

Related U.S. Application Data

(60) Provisional application No. 61/667,189, filed on Jul. 2, 2012.

(51) Int. Cl.
| | |
|---|---|
| *C04B 14/38* | (2006.01) |
| *C04B 7/00* | (2006.01) |
| *C04B 24/00* | (2006.01) |
| *B44F 7/00* | (2006.01) |
| *D04H 3/00* | (2012.01) |
| *D06N 7/00* | (2006.01) |

(52) U.S. Cl.
CPC .. *B44F 7/00* (2013.01); *D04H 3/00* (2013.01); *D06N 7/00* (2013.01)
USPC ........... 428/220; 106/644; 106/713; 106/730; 106/724

(58) Field of Classification Search
None
See application file for complete search history.

(56) References Cited

U.S. PATENT DOCUMENTS

| 5,385,764 A * | 1/1995 | Andersen et al. ............ 428/34.4 |
| 5,514,430 A * | 5/1996 | Andersen et al. ............ 428/34.4 |
| 2002/0166479 A1* | 11/2002 | Jiang ............................ 106/644 |

* cited by examiner

*Primary Examiner* — David Sample
*Assistant Examiner* — Nicole T Gugliotta
(74) *Attorney, Agent, or Firm* — Todd Partners, P.C.; Jack D. Todd

(57) ABSTRACT

A molded, decorative article having a fiber-reinforced geo-composite wall with a thickness of between 4-10 mm and a method of manufacturing the same, the fiber-reinforced geo-composite wall comprising, before curing, predominately 45-55 by weight % mineral-based type III clinker, 24-28 by weight % water, and 8-9 by weight % hydration control agent, the combination of clinker, water, and hydration control agent forming a basic water-reactive rapid-setting cementious binder, the hydration control agent controlling curing time of the water-reactive rapid-setting cementious binder, 1-2 by weight % combination of micro-fibers and macro-fibers dispersed evenly within the cementious binder, the micro-fibers being 3-6 mm and the macro-fibers being 7-25 mm in length, 0.03-0.10 by weight % combination of rheology modifier, polymer modifier, and moisture retention agent, 0-0.18 by weight % combination of dispersion agent and water-reduction agent, and 6-12 by weight % engineered fiber fabric laminated into the fiber-reinforced geo-composite wall before curing, and wherein, after curing, the fiber-reinforced geo-composite wall has a density between 1.5 and 2.0 g/cm³.

19 Claims, 8 Drawing Sheets

300

DRY REACTIVE POWDERS: % IN PART A

| | | |
|---|---|---|
| CSA TYPE III CLINKER | 80.8 % | (75 – 85 %) |
| CALCIUM SULFATE | 14.2 % | (7 – 20 %) |
| ARG MACRO-FIBER | 3 % | (2 – 5 %) |
| IRON OXIDE COLOR PIGMENT | 2 % | (0 – 3 %) |

350

LIQUID COMPONENT: % IN PART B

| | | |
|---|---|---|
| WATER | 96 % | (95 – 97 %) |
| LITHIUM SALT | 0.0038 % | (0 - 0.01 %) |
| HPMC | 0.240 % | (0.1 - 0.5 %) |
| PC ACID | 0.51 % | (0 – 1 %) |
| PVA MICRO-FIBER | 1 % | (0.5 – 2 %) |

THE FOLLOWING REPRESENTS THE PREFERRED RANGE (IN PERCENTAGES) OF EACH COMPONENT IN A TYPICAL SINGLE WALLED LAMINATE FOR A DECORATIVE PRODUCT USING ONLY NEAT PASTE WITHOUT ANY SECONDARY REINFORCING MAT, SUCH AS CSM:

| | |
|---|---|
| CSA TYPE III CLINKER | 55.9 % |
| CALCIUM SULFATE | 9.8 % |
| PVA MICRO FIBER | 0.16 % |
| ARG MACRO FIBER | 2.016 % |
| IRON OXIDE COLOR PIGMENT | 1.379 % |
| WATER | 29.6 % |
| LITHIUM SALT | 0.0018 % |
| HPMC | 0.07 % |
| PC ACID | 0.16 % |
| CSM (MAT) | 0 % |

DRY REACTIVE POWDERS: % IN PART A

| | | |
|---|---|---|
| CSA TYPE III CLINKER | 81.3 % | (80 – 85 %) |
| CALCIUM SULFATE | 14.3 % | (7 – 15 %) |
| PVA MICRO FIBER | 0.8 % | (0.2 – 1.5 %) |
| ARG MACRO FIBER | 1.2 % | (0.5 – 2 %) |
| IRON OXIDE COLOR PIGMENT | 2.4 % | (0 – 3 %) |

650

LIQUID COMPONENT: % IN PART B

| | | |
|---|---|---|
| WATER | 95.1 % | (95 – 96 %) |
| LITHIUM SALT | 0.0048 % | (0 - .01 %) |
| HPMC | 0.143 % | (0.1 - 0.5 %) |
| PC ACID | 0.48 % | (0 - 0.5 %) |

675

SECONDARY REINFORCEMENT CSM MAT: 3 – 14 % OF TOTAL WEIGHT

FIG. 6

THE FOLLOWING REPRESENTS THE PREFERRED RANGE (IN PERCENTAGES) OF EACH COMPONENT IN A TYPICAL LAMINATE FOR A DECORATIVE PRODUCT USING ONLY NEAT PASTE, BUT WITHOUT ANY AGGREGATE ADDED FOR DECORATIVE PURPOSES :

| Component | Percentage |
| --- | --- |
| CSA TYPE III CLINKER | 50.7 % |
| CALCIUM SULFATE | 8.9 % |
| PVA MICRO-FIBER | 0.5 % |
| ARG MACRO-FIBER | 0.8 % |
| IRON OXIDE COLOR PIGMENT | 1.5 % |
| WATER | 26.8 % |
| LITHIUM SALT | 0.0013 % |
| HPMC | 0.040 % |
| PC ACID | 0.13 % |
| CSM (MAT) | 11.6 % |

FIG. 7

THE FOLLOWING REPRESENTS THE PREFERRED RANGE (IN PERCENTAGES) OF EACH COMPONENT IN A TYPICAL LAMINATE WITH THE ADDITION OF AN AGGREGATE IN THE FIRST COAT, SUCH AS DOLOMITE, ADDED TO THE NEAT PASTE FOR DECORATIVE PURPOSES :

| Component | Percentage |
| --- | --- |
| CSA TYPE III CLINKER | 47.3 % |
| CALCIUM SULFATE | 8.25 % |
| PVA MICRO-FIBER | 0.47 % |
| ARG MACRO-FIBER | 0.71 % |
| IRON OXIDE COLOR PIGMENT | 1.35 % |
| DOLOMITE (DECORATIVE AGGREGATE) | 25.6 % |
| WATER | 24.6 % |
| LITHIUM SALT | 0.0012 % |
| HPMC | 0.0420 % |
| PC ACID | 0.123 % |
| CSM (MAT) | 6.1 % |

FIG. 8

MICRO-ENGINEERED POLY-FIBER GEO-COMPOSITE ARTICLES AND METHODS OF MANUFACTURING THE SAME

CROSS REFERENCE TO RELATED APPLICATION

This application claims the benefit under 35 U.S.C. §119(e) of U.S. Provisional Patent Application No. 61/667,189 entitled "Micro-Engineered Poly-Fiber Geo-Composite, Articles of Manufacture Therefrom, and Methods of Manufacturing the Same," filed Jul. 2, 2012, which is incorporated herein by reference in its entirety.

FIELD OF THE PRESENT TECHNOLOGY

The present technology relates generally to composite materials and decorative products made from such composite materials and, in particular, to a newly developed micro-engineered, poly-fiber geo-composite, articles of manufacture made therefrom, and to methods of manufacturing the same. The poly-fiber-reinforced geo-composite described and disclosed herein has the potential for almost unlimited application, but its immediate intended use is for the creation of strong but flexible and light-weight decorative products, including but not limited to garden pots and urns, furniture, figurines, novelties, and other small decorative items.

BACKGROUND OF THE PRESENT TECHNOLOGY

Decorative products have traditionally been made from conventional compositions that include a mixture of calcium-based powder, dolomite powder, polyester resin, styrene, cobalt solution, and methylethylketone peroxide, which may be reinforced with fiberglass mats, and then molded to form a desired object, product, or article of manufacture.

Such compositions may be molded to form durable, impact resistant objects that are useful for a wide range of products (as noted above). However, the materials used in these compositions retain their natural density—even in crushed or powdered form. Thus, in the case of stonecast items, for example, the finished product will have a weight that is substantially identical to the weight of a similarly sized product made of stone (e.g., limestone or dolomite). Accordingly, there is considerable demand in the industry for a stonecast-type product that is much lighter in weight than its stone component(s).

In response to this demand, the industry has seen the development of polyester resin/fiberglass reinforced composites, which offer an alternative to stonecast compositions. These newer composites are often lighter than their natural counterparts, but there are also considerable negatives associated with these newer composites.

First, they are basically a form of plastic, with the same negative environmental impact as any other plastic product. Second, such composites are typically based on petrochemicals, with the same negative characteristics as any petrochemical product (from environmental impact, to market price pressures, to concerns over safety issues such as flammability). Third, the manufacture of such products typically involves odorous noxious chemicals, potentially exposing workers (often in third world countries) to dangerous, unhealthy, and generally undesirable working conditions.

Over the years the industry has made attempts to resolve these issues, notably by replacing fiberglass with cement-based materials or compositions, but these efforts have met with limited commercial success for a variety of reasons, including: (1) setting/hardening times that are too long to be viable for mass production; (2) excessive weight (as with any cement-based product); and (3) poor durability and impact resistance (as compared to fiberglass-based products).

Typical composite designs employ fine reinforcing filaments, either as single fibers or as a bundle of grouped or bonded filaments. The filaments are usually converted to other forms such as fabrics, continuous roving or chopped short, discrete lengths. The short, chopped fibers are often disposed by spraying onto a mold surface, depositing as a dewatered/filtered product or other known processes into thin layers, which are laminated together with binder material to form thick sheets or molded parts. Alternatively, the long strands are oriented in continuous, aligned arrays within the matrix to resist the imposed forces or loads. However, rarely are the reinforcements simply mixed directly into the fluid binder phase and cast as sheets or poured into molds. The fibers simply do not adequately wet-out or coat with the binder, and the longer chopped strands become easily entangled, forming lumps or balls that cannot be properly deposited into sheets or other shapes. The best option developed so far to allow direct mixing and molding of chopped fiber reinforced composites employs the use of high shear mixing and high-pressure molding or pressing equipment. The fiber and binder mixtures are typically produced as either a dilute liquid dispersion or a dough-like compound. In either case the materials must be further processed under precise and demanding conditions properly to set and shape the materials into final products or articles. These formulations and manufacturing techniques are well known to those skilled in the art, but the complexity, cost, and other difficulties in the fabrication process are also well documented. Numerous attempts have been made to try to improve composite processing while maintaining or improving physical properties but, at the same time, maintaining or reducing costs. However, heretofore, none of these techniques has allowed the reinforcements to be easily mixed into the binder and directly cast or molded without specialized equipment or processes. Such composites made from pre-mixed formulations typically suffer from low reinforcement levels, degraded fiber strength, poor fiber dispersion/uniformity, inadequate fiber bonding to the matrix, high void content, and other such problems. While aligned continuous filaments or thin fiber mats can provide high reinforcement levels (e.g., greater than 20 percent, >20%), the processing steps are very complex and not readily adaptable to different configurations. The use of short, chopped fibers can also provide high reinforcement volume levels (e.g., also greater than 20 percent, >20%), but only if rolled, laminated, pressed, extruded, or otherwise processed with specialized processing equipment. Blends of fine filaments and binder, which can be mixed with simple paddle blades or tumbling action and which can be poured and formed directly in open molds without aggressive consolidation or densification methods, generally cannot exceed 1 or 2% fiber volume levels. Some of the newer processing techniques describe the ability to approach 5 or 10% fiber volume content, but the improvements in composite strength over unreinforced binder matrix are still not very significant.

Accordingly, the industry continues to seek discovery and development of new fiber-reinforced composites that allow for the production of lightweight, durable and cheap consumer products and decorative articles, which are safer to manufacture and more environmentally friendly. The poly-fiber-reinforced geo-composite described and disclosed herein addresses and responds to one or more of these issues and needs in the industry, both in the workplace and in the marketplace. The above features and improvements, as well as additional features and aspects of the inventions, are described and disclosed herein and will become apparent from the following description of preferred embodiments of the systems, methods, articles of manufacture, technologies, and techniques.

The present technologies, as described and shown in greater detail hereinafter, address and teach one or more of the above-referenced capabilities, needs, and features that are useful for a variety of businesses and industries as described, taught, and suggested herein in greater detail.

SUMMARY OF THE PRESENT TECHNOLOGY

The present technology relates generally to composite materials and decorative products made from such composite materials and, in particular, to a newly developed micro-engineered, poly-fiber geo-composite, articles of manufacture made therefrom, and to methods of manufacturing the same. The poly-fiber-reinforced geo-composite described and disclosed herein has the potential for almost unlimited application, but its immediate intended use is for the creation of strong but flexible and light-weight decorative products, including but not limited to garden pots and urns, furniture, figurines, novelties, and other small decorative items.

The geo-composite described and disclosed herein is preferably made exclusively (or almost exclusively) from natural materials, which are then mixed and molded with micro-fiber reinforcements, macro-fiber reinforcements, and/or other synthetic materials/fabrics/mats, which are then used to form a consumer product or decorative article that is superior in many respects from similar products currently available in the marketplace, both in its aesthetic quality and in its utility.

A first aspect of the technology disclosed herein includes a molded, decorative article having a fiber-reinforced geo-composite wall with a thickness of between 4-10 millimeters (mm), the fiber-reinforced geo-composite wall comprising: before curing, predominately 50-60 by weight % a mineral-based type III clinker, 28-32 by weight % water, and 8-11 by weight % hydration control agent, the combination of clinker, water, and hydration control agent forming a basic water-reactive rapid-setting cementious binder, the hydration control agent used for controlling curing time of the water-reactive rapid-setting cementious binder, 2-6 by weight % combination of micro-fibers and macro-fibers dispersed evenly within the water-reactive rapid-setting cementious binder, the micro-fibers being 3-6 mm in length and the macro-fibers being 7-25 mm in length, 0.03-0.16 by weight % combination of a rheology modifier, a polymer modifier, and a moisture retention agent, 0-0.33 by weight % combination of a dispersion agent and a water-reduction agent, and 0-1.5 by weight % color pigment, where the fiber-reinforced geo-composite wall, after curing, has a density between 1.5 and 2.0 grams per cubic centimeter ($g/cm^3$).

In a feature, after curing, the thickness of the fiber-reinforced geo-composite wall is between 4-6 mm. In one embodiment, the mineral-based type III clinker is predominantly calcium sulfoaluminate (CSA).

Preferably, the hydration control agent includes one or more of anhydrite, calcium sulfate hemihydrate, and lithium carbonate. In a feature, the combination of micro-fibers and macro-fibers dispersed evenly within the water-reactive rapid-setting cementious binder comprises 1.5-2 times more macro-fibers than micro-fibers.

In another feature, the combination of the rheology modifier, the polymer modifier, and the moisture retention agent comprises high performance hydroxypropyl methylcellulose (HPMC) with a mean viscosity above 200,000 Saybolt Seconds, Universal (SSU). In yet a further feature, the combination of the dispersion agent and the water-reduction agent comprises poly-carboxylic (PC) acid.

A second aspect of the technology disclosed herein includes a molded, decorative article having a fiber-reinforced geo-composite wall with a thickness of between 4-10 millimeters (mm), the fiber-reinforced geo-composite wall comprising: before curing, predominately 45-55 by weight % a mineral-based type III clinker, 24-28 by weight % water, and 8-9 by weight % a hydration control agent, the combination of clinker, water, and hydration control agent forming a basic water-reactive rapid-setting cementious binder, the hydration control agent used for controlling curing time of the water-reactive rapid-setting cementious binder, 1-2 by weight % combination of micro-fibers and macro-fibers dispersed evenly within the water-reactive rapid-setting cementious binder, the micro-fibers being 3-6 mm in length and the macro-fibers being 7-25 mm in length, 0.03-0.10 by weight % combination of rheology modifier, polymer modifier, and moisture retention agent, 0-0.18 by weight % combination of dispersion agent and water-reduction agent, 0-1.5 by weight % color pigment, and 6-12 by weight % engineered fiber fabric laminated into the fiber-reinforced geo-composite wall before curing, and wherein, after curing, the fiber-reinforced geo-composite wall has a density between 1.5 and 2.0 grams per cubic centimeter ($g/cm^3$).

In a feature, after curing, the thickness of the fiber-reinforced geo-composite wall is between 4-6 mm. In one embodiment, the mineral-based type III clinker is predominantly calcium sulfoaluminate (CSA).

Preferably, the hydration control agent includes one or more of anhydrite, calcium sulfate hemihydrate, and lithium carbonate. In a feature, the combination of micro-fibers and macro-fibers dispersed evenly within the water-reactive rapid-setting cementious binder comprises 1.5-2 times more macro-fibers than micro-fibers.

In another feature, the combination of the rheology modifier, the polymer modifier, and the moisture retention agent comprises high performance hydroxypropyl methylcellulose (HPMC) with a mean viscosity above 200,000 Saybolt Seconds, Universal (SSU). In yet a further feature, the combination of the dispersion agent and the water-reduction agent comprises poly-carboxylic (PC) acid.

Preferably the engineered fiber fabric is a random, open weave chopped strand mat (CSM) produced from a multi-strand assembled roving.

A third aspect of the technology disclosed herein includes a method of manufacturing a decorative article having a fiber-reinforced geo-composite wall with a thickness of between 4-10 millimeters (mm), comprising: (i) preparing a mold having a surface in a shape corresponding with at least one surface of the decorative article; (ii) calculating amounts of dry (Part A) components and wet (Part B) components needed to produce the decorative article within the mold; (iii) measuring out each of the respective Part A and Part B components; (iv) mixing the Part A components together in a cementious mixer until evenly dispersed therein; (v) mixing the Part B components in a separate container; (vi) gradually adding and mixing the Part B mixture into the Part A mixture to create a neat paste where the Part B to Part A mixture is combined at a ratio between approximately 0.38 and 0.50; (vii) painting a layer of the neat paste onto the surface of the mold, the layer of the neat paste having a thickness between 2 and 10 mm and forming two surfaces of the decorative product, the at least one surface engaged with and shaped by the surface of the mold and an opposite, exposed surface not engaged with the surface of the mold; (viii) finishing the exposed surface of the neat paste to define the thickness of the neat paste and to provide the exposed surface with a desired surface texture; (ix) allowing the neat paste to remain in the mold for a time period T1 to enable the decorative article to reach an initial curing point; (x) after the decorative article has reached the first curing point, removing the decorative article from the mold; and (xi) allowing the decorative article removed from the mold to dry for a time period T2 to reach a final curing point.

In one embodiment, the method of manufacturing the decorative article further comprises coloring and finishing one or both of the surfaces of the decorative article after the decorative article has reached the initial curing point and been removed from the mold. In another embodiment, the method of manufacturing the decorative article further comprises coloring and finishing one or both of the surfaces of the decorative article after the decorative article has reached the final curing point.

In one embodiment, the method further comprises placing a layer of engineered fiber fabric onto the layer of neat paste on the surface of the mold and laminating the layer of engineered fiber fabric into the neat paste by adding additional neat paste thereupon, the layer of neat paste having a final, combined thickness between 3 and 8 mm.

In another embodiment, the method further comprises placing two or more layers of engineered fiber fabric onto the layer of neat paste on the surface of the mold and laminating each of the two or more layers of engineered fiber fabric into the neat paste by adding additional neat paste upon each of the respective two or more layers of engineered fiber fabric, the layer of neat paste having a final, combined thickness between 4 and 6 mm.

In one feature, the method further comprises adding filler to the neat paste to increase the thickness of the wall of the decorative article. In another feature, the method further comprises adding aggregate to the neat paste to provide a decorative element to the wall of the decorative article.

In another feature, the present invention includes a decorative article manufactured according to the above method of manufacturing a decorative article having a fiber-reinforced geo-composite wall.

The above aspects, features, elements, components and embodiments as well as additional features and aspects of the technology, systems, products, articles of manufacture, apparatuses, and methods described herein, or components or portions thereof, are disclosed herein or will become apparent from the following description of preferred embodiments thereof.

This summary is provided to introduce a selection of aspects and concepts in a simplified form that are further described below in the detailed description. This summary is not necessarily intended to identify all key or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In addition, further features and benefits of the present technology will be apparent from a detailed description of preferred embodiments thereof taken in conjunction with the following drawings, wherein similar elements are referred to with similar reference numbers, and wherein:

FIG. 3 illustrates components needed to make the Neat Paste for the single-walled decorative product of FIG. 2;

FIG. 4 illustrates the relative percentages of components that make up the pre-cured decorative article of FIG. 2;

FIG. 6 illustrates components needed to make the reinforced Neat Paste for the multi-walled decorative product of FIG. 5;

FIG. 7 illustrates the relative percentages of components that make up the pre-cured decorative article of FIG. 5; and FIG. 8 illustrates the relative percentages of components that make up the pre-cured decorative article of FIG. 5 having dolomite added for decorative purposes.

DETAILED DESCRIPTION OF PREFERRED EMBODIMENTS

Figure 1:
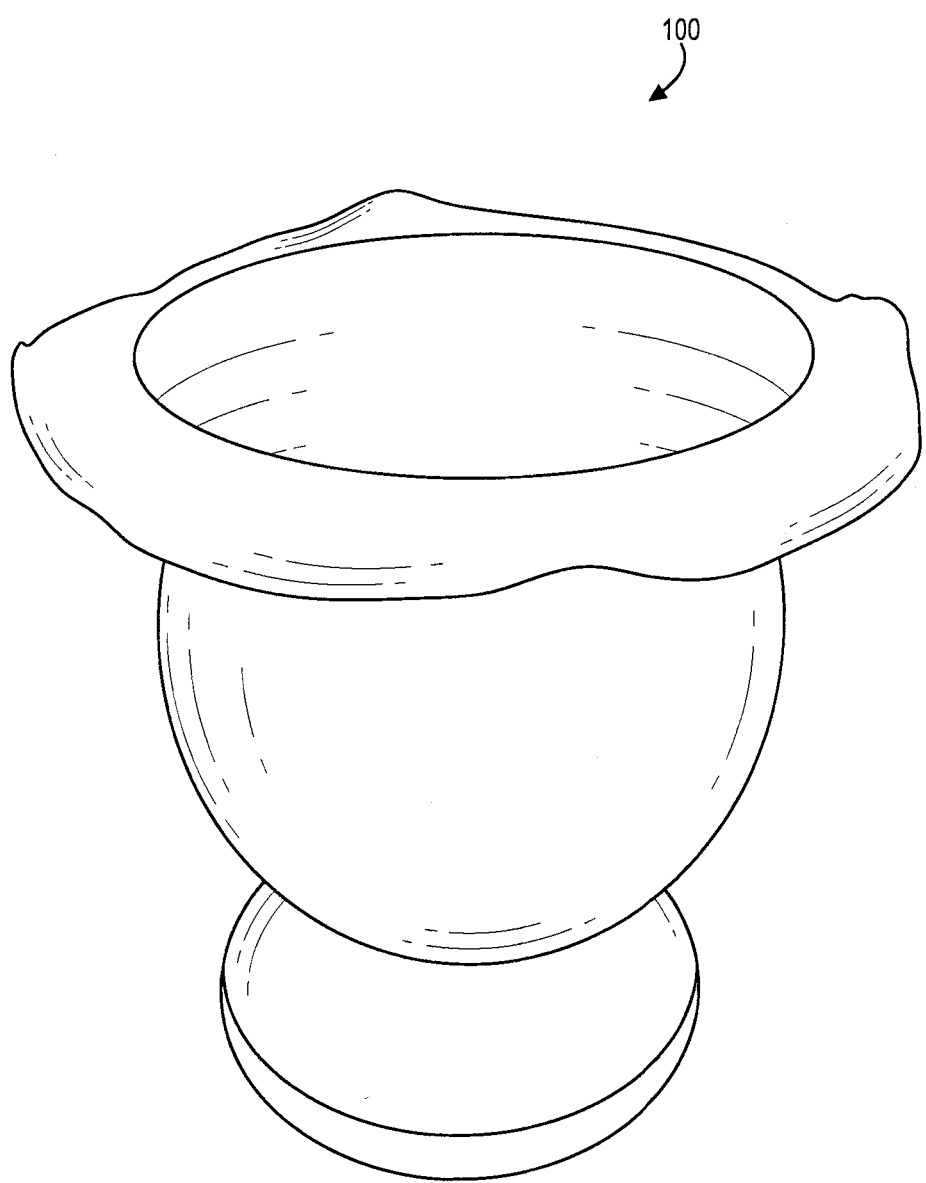
FIG. 1 illustrates an exemplary decorative article made using the micro-engineered, poly-fiber geo-composite and according to the methods of manufacturing disclosed herein.

Before the present technologies, systems, products, articles of manufacture, apparatuses, and methods are disclosed and described in greater detail hereinafter, it is to be understood that the present technologies, systems, products, articles of manufacture, apparatuses, and methods are not limited to particular arrangements, specific components, or particular implementations. It is also to be understood that the terminology used herein is for the purpose of describing particular aspects and embodiments only and is not intended to be limiting.

As used in the specification and the appended claims, the singular forms "a," "an" and "the" include plural referents unless the context clearly dictates otherwise. Similarly, "optional" or "optionally" means that the subsequently described event or circumstance may or may not occur, and the description includes instances in which the event or circumstance occurs and instances where it does not.

Throughout the description and claims of this specification, the word "comprise" and variations of the word, such as "comprising" and "comprises," mean "including but not limited to," and is not intended to exclude, for example, other components, integers, elements, features, or steps. "Exemplary" means "an example of" and is not necessarily intended to convey an indication of preferred or ideal embodiments. "Such as" is not used in a restrictive sense, but for explanatory purposes only.

Disclosed herein are components that can be used to perform the herein described technologies, systems, products, articles of manufacture, apparatuses, and methods. These and other components are disclosed herein, and it is understood that when combinations, subsets, interactions, groups, etc. of these components are disclosed that while specific reference to each various individual and collective combinations and permutation of these may not be explicitly disclosed, each is specifically contemplated and described herein, for all technologies, systems, products, articles of manufacture, apparatuses, and methods. This applies to all aspects of this specification including, but not limited to, steps in disclosed methods. Thus, if there are a variety of additional steps that can be performed, it is understood that each of the additional steps can be performed with any specific embodiment or combination of embodiments of the disclosed technologies, systems, products, articles of manufacture, apparatuses, and methods.

As will be appreciated by one skilled in the art, embodiments of the present technologies, systems, products, articles of manufacture, apparatuses, and methods may be described below with reference to block diagrams and flowchart illustrations of methods, systems, processes, steps, and apparatuses. It will be understood that each block of the block diagrams and flow illustrations, respectively, support combinations of means for performing the specified functions and/or combinations of steps for performing the specified functions.

A. Poly-Fiber-Reinforced Geo-Composite—Components and Characteristics

The poly-fiber-reinforced geo-composite described and disclosed herein preferably has a weight that is no heavier than comparably sized and shaped fiberglass products for which the poly-fiber-reinforced geo-composite described and disclosed herein has been designed to replace. Upon curing, the composite has a final, resulting density of between 1.5 to 2.0 g/cm$^3$ (grams per cubic centimeter) and preferably a density of approximately 1.6 g/cm$^3$ (grams per cubic centimeter), and it has sufficient durability and impact resistance for use in decorative, consumer-type (i.e., non-construction and non-industrial) products. Preferably, the composite may be used to make strong but flexible and light-weight decorative products, including but not limited to garden pots and urns, furniture, figurines, novelties, and other small decorative items. One such exemplary product or article, in this case a typical garden pot 100, made using the composite and methods of manufacture disclosed and discussed herein, is illustrated in FIG. 1. In addition, the manufacturing process and setting times are comparable to the ease and short setting times, respectively, associated with conventional fiberglass manufacturing processes. Yet further, the poly-fiber-reinforced geo-composite described and disclosed herein is formulated and processed so that, preferably, it can be used to make such decorative, consumer-type products using lower labor skill sets and equipment similar to that used in conventional fiberglass manufacturing. Additionally, the poly-fiber-reinforced geo-composite described and disclosed herein is preferably and substantially composed of natural and environmentally-friendly materials, without sand-based cement, without petrochemicals, and without the need for kiln drying.

The poly-fiber-reinforced geo-composite described and disclosed herein is preferably made using the following components:

1. Binder.

A preferred binder used in the geo-composite itself includes calcium sulfoaluminate (CSA) type III clinker and calcium sulfate. CSA cements are a class of specialty cements that are included in the family of rapid-setting cements; they have a low carbon footprint, low alkalinity, lower shrinkage, shorter curing time, rapid strength gain, and are easily dyeable, paintable, or stained, as compared to many other types of cement. According to the ASTM C150 standard, type I cements are normal, general purpose, type IA cements are normal, air entrained, type II cements have moderate sulfate resistance, and type III cements are those characterized as having high early strength. Gypsum or calcium sulfate dehydrate is used as a binder additive that is generally used to control the set time of the composite. Similar-type binders may be used in alternative embodiments, but typically are not as preferable as CSA type III clinker and calcium sulfate for one reason or another (e.g. cost, ease of use, weight, strength, durability, set times, ability to color, dye or strain the end product, etc.). Such alternate binders include Original Portland Cement (OPC), calcium aluminate cement (CAC), phosphate cement, magnesium oxide (MGO) cement, or any other mineral binder that reacts with water to form a hydraulic cement or that goes through a chemical reaction to cure into a hardened form.

2. Micro-Fiber.

A preferred micro-fiber that provides one aspect of the poly-fiber-reinforcement of the geo-composite described and disclosed herein, which is primarily used for crack control purposes, is a polyvinyl alcohol (PVA) monofilament fiber, 3-6 mm in length and with a diameter between 2-20 microns. Alternate micro-fibers include polyester, nylon, polypropylene (PP) fibers, polyacrylanitrile (PAN) fiber, Kevlar®—a para-aramid synthetic fiber produced and sold by DuPont, amorphous metal fibers, glass fibers, organic plant fibers, such as bamboo fiber, or mineral fiber, such as wollastonite, all preferably under 6 mm in length.

3. Macro-Fiber.

A preferred macro-fiber that provides another aspect of the poly-fiber-reinforcement of the geo-composite described and disclosed herein is primarily used for structural reinforcement of the walls of any resulting product or article, after curing of the geo-composite material. The macro-fiber is preferably an alkali resistant glass (ARG) engineered pre-cut fiber bonded for pre-dispersion, such as NEG ACS13H350Y® (which is available from Nippon Electric Glass Co Ltd Glass Fiber Division, Osaka Japan) or polyvinyl alcohol (PVA) monofilament fiber, such as Kuraray REC15® (which is available from Kuraray Co. Ltd in Japan), or a combination of the two. Alternate macro-fibers that may be used include any of the micro-fiber types listed above, but with a longer fiber strand length, typically greater than 6 mm and preferably in the range between 6 to 25 mm.

4. Engineered Fiber.

In some embodiments, particularly when the poly-fiber-reinforced geo-composite described and disclosed herein is being used to make larger or heavier end products, the composite also preferably includes engineered fiber fabric embedded or laminated therein, which is useful for providing secondary, structural reinforcement to the geo-composite—whether or not such geo-composite already has reinforcement provided by the above-described micro-fibers and/or macro-fibers. Such engineered fiber fabric is preferably in the form of chopped strand mat (CSM), which may be produced in many ways, but which, in a preferred embodiment, is produced from a 2400 tex, multi-strand (e.g., 9-strand) assembled roving that results in a random open weave fabric mat. Preferably, such CSM fibers are silane-bonded with alkali resistant glass (ARG), electrical grade glass (E glass), or electrical grade, corrosion-resistant glass (E-CR glass) fiber. Alternate engineered fibers that could be used include geo-fabrics, woven cloths, and assembled fiber meshes made from any of the micro-fibers or macro-fibers identified above.

5. Water.

Preferably potable drinking water. However, recycled water may also be used as long as it has acceptable, minimal levels of impurities, pollutants, or other contaminants. Note also that since water in different locations may have mildly differing levels of naturally-occurring mineral content, slight modification to the relative amounts or percentages of components may be necessary, as will be appreciated by one of skill in the art, to achieve consistent results for products made using different water sources.

6. Rheology Modifier.

High performance hydroxypropyl methylcellulose (HPMC) with a mean viscosity above 200,000 Saybolt Seconds, Universal (SSU) is the preferred component used in the fiber-reinforced geo-composite disclosed and discussed herein to achieve optimal rheology. Alternate rheology modifiers that could be used herein include typical geo-composite "thickening agents" so long as they are compatible with the above-selected binder, such as but not limited to gelatin, starch, xanthum gum, bentonites, and acrylic polymers.

7. Polymer Modifier.

High performance hydroxypropyl methylcellulose (HPMC) with a mean viscosity above 200,000 SSU is also the preferred component used in the used in the fiber-reinforced geo-composite disclosed and discussed herein to achieve desired polymer modification. As an alternative, latexes, elastomers, or thermo plastics of any chemistry compatible with the above-selected binder can be used to improve chemical or mechanical properties of the geo-composite.

8. Moisture Retention Agent.

High performance hydroxypropyl methylcellulose (HPMC) with a mean viscosity above 200,000 SSU is also the preferred component in the fiber-reinforced geo-composite disclosed and discussed herein to achieve optimal moisture retention. Alternate moisture retention agents compatible with the chosen binder could also include acrylic co-polymers (such as film formers).

9. Hydration Control Agents.

A preferred hydration control agent used with the composite includes a controlled combination of anhydrite and calcium sulfate hemihydrate, plus lithium carbonate. The hydration control agent helps control the set or cure time of the composite.

10. Dispersion Agent.

A preferred agent used for dispersion purposes with the composite includes poly-carboxylic (PC) acid. As an alternative, one could use any dispersing agent common to the industry (either a non-surface active polymer or a surface-active substance) so long as such dispersing agent is compatible with the binder chemistry.

11. Water Reducing Agent.

Poly-carboxylic (PC) acid is also a preferred agent used for water reduction purposes used with the composite. Poly-carboxylic (PC) acid water-reducing agent is suitable for pumping or normal concrete engineering, particularly for engineering with high durability, excellent fluidity, strong slump retention ability, and excellent aesthetic appearance of the resulting end product. Any other water-reducing agent common to the industry could be used in the fiber-reinforced geo-composite disclosed and discussed herein, if necessary or desired.

B. Poly-Fiber-Reinforced Geo-Composite—Advantages

Historically, fiber-reinforced cement composites are typically prepared from "mortars" (cement and sand) because conventional "neat pastes" crack and fail to produce useable monoliths or solids. In recent years there has been some progress in developing micro defect free (MDF) cements using finely-graded aggregates. There has been little-to-no progress, however, in the development of a pure "neat paste" (without the use or need for aggregates) that is suitable for producing durable solids—until now.

The newly developed process and resulting neat paste described herein mixes one or more types of fiber into the neat paste that, after curing, yields a fiber-reinforced geo-composite that is similar in durability to a fine aggregate/mortar mixture. But, the neat paste offers several advantages over traditional mortar, including:

1. Lower Density.

The neat paste disclosed and described herein has a density of between 1.5 to 2.0 g/cm$^3$ (grams per cubic centimeter) and preferably a density of approximately 1.6 g/cm$^3$ (grams per cubic centimeter) compared to a density of 2.3 to 2.6 g/cm$^3$ (grams per cubic centimeter), which is the typical density range for traditional or conventional mortar/silica mixtures.

2. Greatly Reduced Fiber Dispersion Problems.

Use of geo-composite neat paste reduces or eliminates concern over interaction between traditional aggregates and traditional fiber, which is a major problem when dealing with high-fiber loading in a traditional mortar mixture, in which aggregate grain size and shape must be carefully matched to the micro-fiber length and diameter. In contrast with typical mortar composites, neat paste, as used in the fiber-reinforced geo-composite disclosed and discussed herein, does not require or need to use aggregate. Further, the largest grains in the neat paste are typically the clinker particles themselves; thus, making fiber dispersion considerably less complicated. As will be explained hereinafter, however, "aggregate" or "filler" may optionally be used with the fiber-reinforced geo-composite disclosed and discussed herein, but such use is typically not structural in nature, but merely for decorative purposes, for the purpose of adding texture to the surfaces of the decorative end product, or for bulking out/thickening of the product wall, if desired, without use of additional fibers.

3. The Dynamics of the Hydration is More Active.

Because the reactive clinker particles are closer together in the preferred neat paste described herein, there are no aggregates to dilute the hydration reaction. For this reason, the result is a faster chemical reaction, producing more energy and a more rapid cure or setting of the fiber-reinforced geo-composite disclosed and discussed herein.

4. Other Advantages and Benefits of the Disclosed Neat Paste.

Using a calcium sulfoaluminate (CSA) based binder system, with its low alkalinity, and lack of free calcium hydroxide, means that fiber-reinforced geo-composites can be produced with common E-glass fiber chopped strand mat (CSM) at a fraction (approximately ¼) of the cost of an alkali resistant glass (ARG) system necessary for use with an Ordinary Portland Cement (OPC) binder, such as conventional glass fiber reinforced concrete (GFRC) composites.

The use of engineered fiber fabric embedded or laminated within the neat paste described herein also proved useful for providing secondary, structural reinforcement to the geo-composite—whether or not such geo-composite already has reinforcement provided by the above-and-below described micro-fibers and macro-fibers. Such engineered fiber fabric is preferably in the form of chopped strand mat (CSM), which may be produced in many ways, but which, in a preferred embodiment, is produced from a 2400 tex, multi-strand (e.g., 9-strand) assembled roving that results in a random open weave fabric mat. Preferably, such CSM fibers are silane-bonded with alkali resistant glass (ARG), electrical grade glass (E glass), or electrical grade, corrosion-resistant glass (E-CR glass) fiber. Such glass fiber chopped strand mat (CSM) proved durable, but also flexible enough to mold into very complex shapes and are capable of being laminated into the neat paste within a product mold.

More specifically, perceived complications of how to wet out and laminate a glass fiber chopped strand mat (CSM) with a cement mortar turned out to be easily resolved when a neat paste, as described herein, was used. In fact, it was discovered that it was possible to produce extremely thin section (4-6 mm) sheets of fiber-reinforced geo-composite material with a fiber content by weight exceeding (10%) ten percent! This is something that has never been done before—given that maximum fiber possible in glass fiber reinforced concrete (GFRC) is generally deemed to be in the range of no more than five to six percent (5%-6%). As a result, thin section panels of chopped strand glass fiber mat (CSM) laminated into the neat paste described herein are typically flexible enough to roll like plastic a full quarter turn without breaking Glass fiber reinforced concrete (GFRC) composites themselves are rigid structures, whereas engineered cementitious composites (ECC, also known as "bendable concrete") that make use of fiber chopped strand mat (CSM) are ductile, flexible structures. Producing GFRC-ECC "poly-fiber" geo-composites, according to one embodiment of the present invention, yielded a consumer product or decorative article that is strong, flexible, and light weight.

It was found that geo-composites with micro-fiber addition of 1% to 2% (as primary reinforcement) and engineered glass fiber additions, in the form of CSM (anywhere from 5%-10% of additional fiber by weight), provided thin section (4-6 mm), strong, moldable, resilient, and quick setting geo-composites that had many positive properties similar to fiberglass resin.

Neat pastes containing micro-fiber (3-6 mm in length) additions of 1% by weight (1000 filaments per mm of neat paste, when fully dispersed) as well as additionally-layered macro-fibers (6-20 mm in length) of up to 2% by weight, with water/binder (or liquid-to-powder component) ratios between 0.38 and 0.50 (and preferably in the range between approximately 0.40 and 0.45), were still fluid and workable enough to laminate directly into the above-described chopped strand mat (CSM).

It was also discovered that when a neat paste was saturated in one fiber (e.g. 1% PVA micro-fiber) with a diameter of 2-microns and length of five mm, it was still possible to add an additional macro-fiber with a 50-micron diameter and 12 mm length into the neat paste, without significantly affecting its rheology. In this way, fiber loadings could be increased and the neat paste was still kept workable.

The neat paste was also modified with polycarboxylate super-plasticizer (also referred to above as the poly-carboxylic (PC) acid) to aid in dispersal and workability. CSA clinker has a high water demand (much higher than OPC), and although it is possible to go below a 0.35 water/binder ratio, a water/binder ratio between 0.38 and 0.50 (and in the range between approximately 0.40 and 0.45) appeared to be preferable, as it allows for the formation of Ettingite crystals in the very early stage of hydration. The control of the gypsum species (e.g., calcium sulfate dehydrate) and lithium carbonate (or lithium salts) in the calcium sulfoaluminate (CSA) chemistry yield a fiber-reinforced geo-composite that could be cast and stripped from its mold—often in as few as 11 minutes of curing time. This was a huge improvement over conventional fiberglass resin/cement composites, which are much slower to cure and, therefore, do not result in viable production rates offered by use of the poly-fiber-reinforced geo-composite described and disclosed herein.

Maintaining water for hydration is also important in the process of working with and using thin section composites (i.e., on the order of only 4-6 mm in thickness) due to the heat of hydration and the very high surface area of the poly-fiber-reinforced geo-composite described and disclosed herein—relative to its total mass. Thus, it is generally desirable to maximize water retention qualities in the neat paste. To accomplish this, hydroxypropyl methylcellulose (HPMC) is added to the composite to provide a resin-like rheology. Other polymers common in the industry could also be added, but it was found that such commonly-available polymers only increased the material costs without providing any significantly improvements to the quality of the neat paste or the resulting end product.

Using existing clay production techniques, single wall construction (without secondary engineering glass fiber mat) is possible for smaller decorative items. It is also conceivable that with continued development the fiber content can be increased to a point where larger, single-walled objects can eventually be produced by this same single-walled construction method. At present, however, secondary engineering glass fiber mat (CSM) is preferably used for the production of larger decorative items or products to improve the durability and strength of such larger items.

C. Poly-Fiber-Reinforced Geo-Composite Manufacturing Processes

1. Single-Walled Products—No Engineered Fiber Reinforcement.

Figure 2:
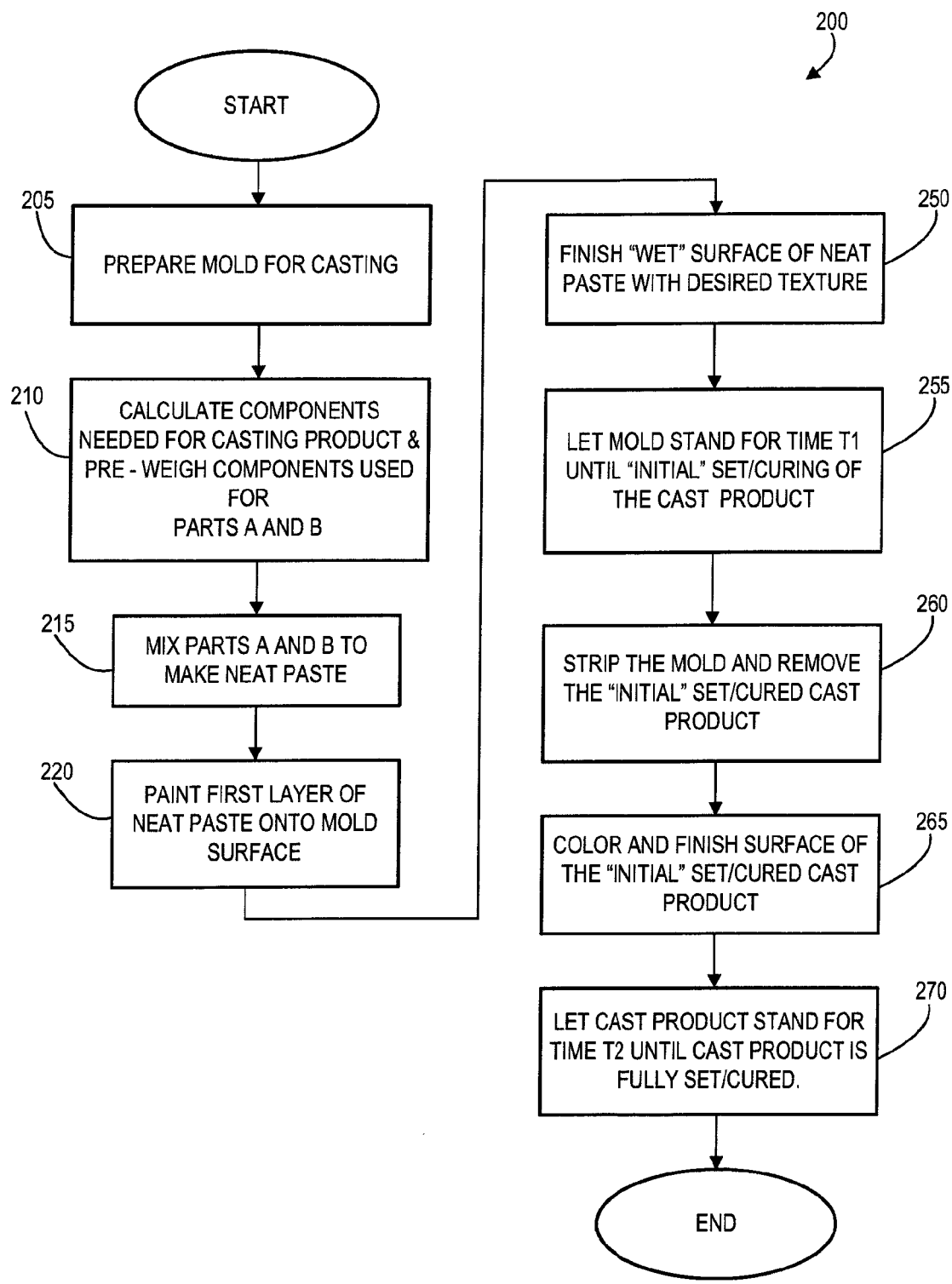
FIG. 2 is a flow chart of an exemplary manufacturing process for making a single-walled decorative product.

Turning now to FIG. 2, one exemplary process 200 for manufacturing single-walled (i.e., without secondary engineered fiber fabric or mat) consumer products or decorative articles, such as the decorative garden pot 100 as shown in FIG. 1, having a poly-fiber-reinforced geo-composite wall with a thickness of between 4 and 10 millimeters (mm), in accordance with the teachings of the present invention, are described in greater detail. Initially, a mold having a surface in a shape corresponding with at least one surface of the decorative article 100 is prepared (Step 205) for receiving uncured poly-fiber-reinforced geo-composite material. Next, the amounts of dry (Part A) components and wet (Part B) components needed to produce the decorative article within the mold are calculated and measured out (Step 210). As will be explained hereinafter, "Neat Paste" refers to the cement mortar paste (resulting from the mixture of the dry powder (Part A) components with the water-based liquid (Part B) components), inclusive of any micro-fibers or macro-fibers added to the dry powder or liquid or both.

Turning briefly to FIG. 3, the components needed to make Neat Paste for manufacturing single-walled consumer products or decorative articles is illustrated. The relative percentages of components that make up the dry reactive powders (Part A) are shown in table 300 and the relative percentages of components that make up the liquid (Part B) are shown in table 350. As shown in table 300, the dry reactive powders (Part A), in one preferred embodiment, include: (i) between 75 and 85 by weight percent of CSA Type 3 clinker (with a preferred by weight percentage of about 80.8%), (ii) between 7 and 20 by weight percent of calcium sulfate (with a preferred by weight percentage of about 14.2%), (iii) between 2 and 5 by weight percent of macro-fiber (with a preferred by weight percentage of about 3%), and (iv) between 0 and 3 by weight percent of color pigment (with a preferred by weight percentage of about 2%). As shown in table 350, the liquid (Part B), in one preferred embodiment, include: (i) between 95 and 97 by weight percent of water (with a preferred by weight percentage of about 96%), (ii) between 0 and 0.01 by weight percent of lithium salt (with a preferred by weight percentage of about 0.0038%), (iii) between 0.1 and 0.5 by weight percent of HPMC (with a preferred by weight percentage of about 0.240%), (iv) between 0 and 1 by weight percent of PC acid (with a preferred by weight percentage of about 0.51%), and (v) between 0.5 and 2 by weight percent of micro-fiber (with a preferred by weight percentage of about 1%).

Turning back to FIG. 2, at Step 215, the Part A components are mixed together in a cementious mixer until evenly dispersed therein, the Part B components are mixed in a separate container, and then the Part B mixture is gradually added and mixed into the Part A mixture to create a substantially-uniform Neat Paste. The Part B liquid to Part A dry powder mixture is combined at a ratio between approximately 0.38 and 0.50 (and preferably in the range between approximately 0.40 and 0.45). More specifically, the macro-fibers of Part A are pre-blended and dispersed with the dry reactive powders in a mixer designed for dry powders containing high fiber content. Such a mixer is configured to minimize or prevent the clumping or balling of the macro-fibers. Additionally, the micro-fiber of Part B is pre-dispersed into the liquid components. The poly-carboxylic (PC) acid and hydroxypropyl methylcellulose (HPMC) are all prepared with the water and micro-fiber in a dispersion mixer with a blade shaped to minimize clogging caused by the fiber. The resulting Neat Paste is soft and malleable.

It should be understood that dolomite (decorative aggregates) or fillers can be added to this layer of Neat Paste for the purpose of bulking out the product wall or for decorative purposes. However, adding such fillers does add weight and can sometimes reduce the strength and/or durability of the overall composite and the final product. Fillers, compatible non-reactive ultra fine powders, such as a calcium carbonate, meta kaolin, or other alumina silicates, may also be added to adjust the viscosity of the mixture until a dough-like consistency is achieved. Then, at room temperature and atmospheric pressure conditions, the applied mixture is allowed to set.

Next, the Neat Paste is painted or otherwise applied (Step 220) onto the surface of the mold, the layer of the neat paste preferably having a thickness between 2 and 10 mm and defining two surfaces of the decorative product, one surface engaged with and shaped by the surface of the mold and an opposite, exposed surface not engaged with the surface of the mold. Preferably, application of the Neat Paste to the existing mold may be done manually or mechanically using a cold casting process by applying the mixed components to the mold surface in conventional manner.

The exposed surface of the Neat Paste is then finished (Step 250) to establish the desired thickness of the Neat Paste and to provide the exposed surface with a surface texture (if desired). The Neat Paste is then allowed (Step 255) to remain in the mold for a predetermined time period (T1) to enable the composite to reach an initial curing point. The working time is adjusted depending on the complexity of the end product being molded. The working time is typically twenty (20) minutes and the predetermined time period (T1) to enable the composite to reach an initial curing point is within about one (1) hour on large products, or as quickly as ten (10) minutes for smaller products. After the decorative article has reached the initial curing point, the decorative article is then removed (Step 260) from the mold. Optionally, one or both of the surfaces of the decorative article are then colored and finished (Step 265) after the decorative article has reached the initial curing point and been removed from the mold. The decorative article removed from the mold is then allowed to dry (Step 270) for a time period T2 to reach a final curing point. The time period (T2) may be anywhere from 3 to 10 days.

No humidity control is necessary in any of the above-mentioned steps. In addition, since the process is a cold-casting process, it does not require the use of a kiln to bake the finished product to cure or set the composite. It is, however, preferred that the casting process be done in a covered, well-ventilated location. The formed usable and/or ornamental article may vary in size, shape, design, color, and weight, as desired.

Turning now to FIG. 4, table 400 illustrates the relative percentages of components that make up the as assembled, pre-cured decorative article manufactured from the above, single-walled process. As shown in table 400, in one preferred embodiment, the pre-cured decorative article includes: (i) between 50 and 60 by weight percent of CSA type III clinker (with a preferred by weight percentage of about 55.9%), (ii) between 8 and 11 by weight percent of calcium sulfate (with a preferred by weight percentage of about 9.8%), (iii) between 0.10 and 0.50 by weight percent of micro-fiber (with a preferred by weight percentage of about 0.16%), (iv) between 1.9 and 5.5 by weight percent of macro-fiber (with a preferred by weight percentage of about 2.016%), (v) between 0 and 1.5 by weight percent of color pigment (with a preferred by weight percentage of about 1.379%), (vi) between 28 and 32 by weight percent of water (with a preferred by weight percentage of about 29.6%), (vii) between 0 and 0.003 by weight percent of lithium salt (with a preferred by weight percentage of about 0.0018%), (viii) between 0.03 and 0.16 by weight percent of HPMC (with a preferred by weight percentage of about 0.07%), and (ix) between 0 and 1.5 by weight percent of PC acid (with a preferred by weight percentage of about 0.16%). Weight loss on drying represents the evaporation of the excess water not taken up in Hydration. When the water/binder ratios are kept between 0.38 and 0.50, the typical weight loss is typically between 2 and 5% weight drop over 10 days.

2. Multi-Walled Products—with Engineered Fiber Reinforcement.

Figure 5:
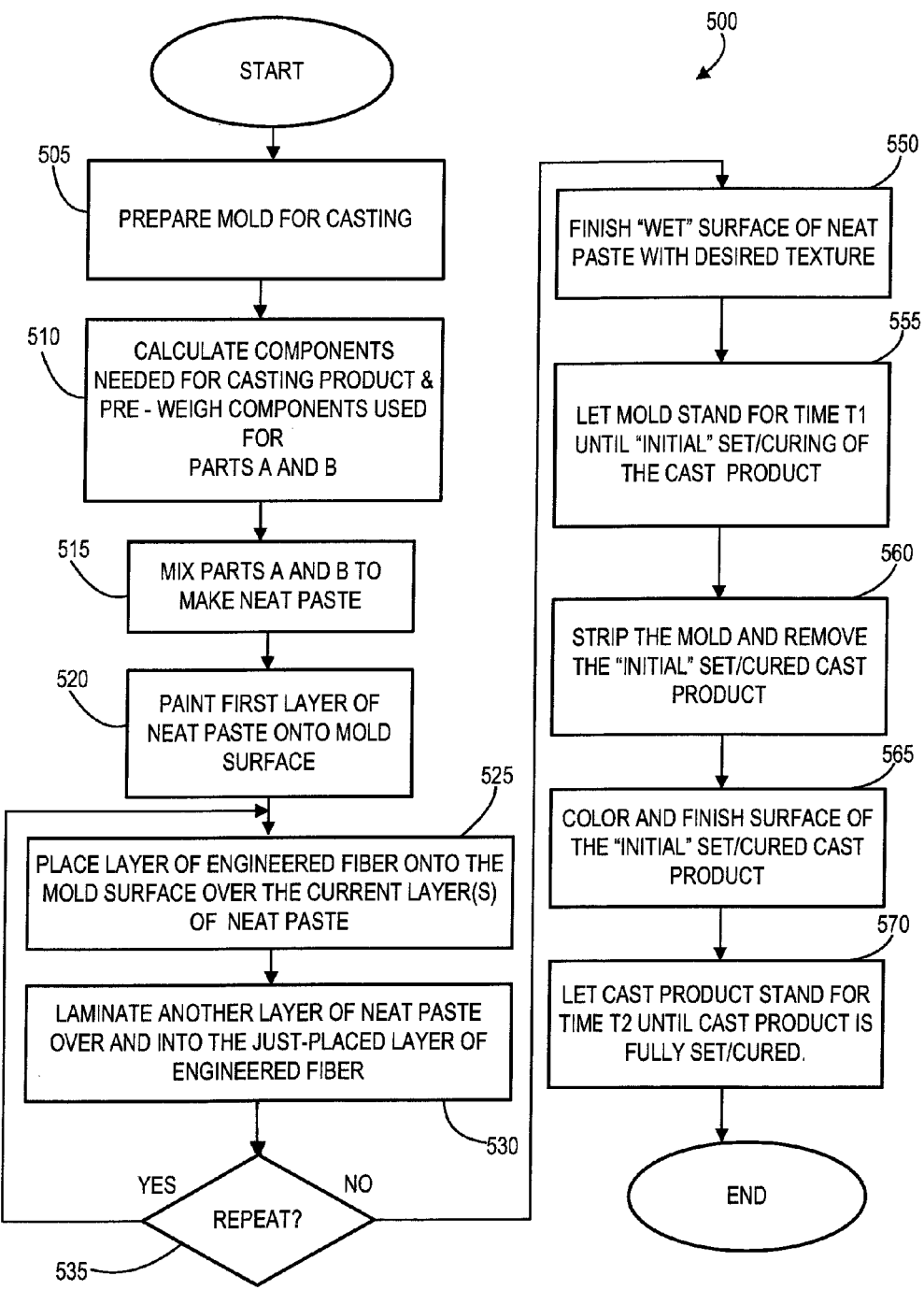
FIG. 5 is a flow chart of an exemplary manufacturing process for making a reinforced, multi-walled decorative product.

Turning now to FIG. 5, one exemplary process 500 for manufacturing multi-walled (i.e., with secondary engineered fiber fabric or mat) consumer products or decorative articles, such as the decorative garden pot 100 as shown in FIG. 1, having a poly-fiber-reinforced geo-composite wall with a thickness of between 4 and 10 millimeters (mm), in accordance with the teachings of the present invention, are described in greater detail. Initially, a mold having a surface in a shape corresponding with at least one surface of the decorative article 100 is prepared (Step 505) for receiving uncured poly-fiber-reinforced geo-composite material. Next, the amounts of dry (Part A) components and wet (Part B) components needed to produce the decorative article within the mold are calculated and measured out (Step 510). As will be explained hereinafter, "Neat Paste" refers to the cement mortar paste (resulting from the mixture of the dry powder (Part A) components with the water-based liquid (Part B) components), inclusive of any micro-fibers or macro-fibers added to the dry powder or liquid or both.

Turning briefly to FIG. 6, the components needed to make Neat Paste for manufacturing single-walled consumer products or decorative articles is illustrated. The relative percentages of components that make up the dry reactive powders (Part A) are shown in table 600 and the relative percentages of components that make up the liquid (Part B) are shown in table 650. Further, the relative percentage of engineered fiber fabric, as compared to the components in Part A and Part B, is shown in table 675. As shown in table 600, the dry reactive powders (Part A), in one preferred embodiment, include: (i) between 80 and 85 by weight percent of CSA Type 3 clinker (with a preferred by weight percentage of about 81.3%), (ii) between 7 and 15 by weight percent of calcium sulfate (with a preferred by weight percentage of about 14.3%), (iii) between 0.2 and 1.5 by weight percent of micro-fiber (with a preferred by weight percentage of about 0.8%) (iv) between 0.5 and 2 by weight percent of macro-fiber (with a preferred by weight percentage of about 1.2%), and (v) between 0 and 3 by weight percent of color pigment (with a preferred by weight percentage of about 2.4%). As shown in table 650, the liquid (Part B), in one preferred embodiment, includes: (i)

between 95 and 96 by weight percent of water (with a preferred by weight percentage of about 95.1%), (ii) between 0 and 0.01 by weight percent of lithium salt (with a preferred by weight percentage of about 0.0048%), (iii) between 0.1 and 0.5 by weight percent of HPMC (with a preferred by weight percentage of about 0.143%), and (iv) between 0 and 0.5 by weight percent of PC acid (with a preferred by weight percentage of about 0.48%).

Turning back to FIG. 5, at Step 515, the Part A components are mixed together in a cementious mixer until evenly dispersed therein, the Part B components are mixed in a separate container, and then the Part B mixture is gradually added and mixed into the Part A mixture to create a substantially-uniform Neat Paste. The Part B liquid to Part A dry powder mixture is combined at a ratio between approximately 0.38 and 0.50 (and preferably in the range between approximately 0.40 and 0.45). More specifically, the micro-fibers and macro-fibers of Part A are pre-blended and dispersed with the dry reactive powders in a mixer designed for dry powders containing high fiber content. Such a mixer is configured to minimize or prevent the clumping or balling of the macro-fibers. The poly-carboxylic (PC) acid and hydroxypropyl methylcellulose (HPMC) are prepared with the water in a dispersion mixer. The resulting Neat Paste is soft and malleable.

By keeping the micro-fiber and macro-fiber additions under three percent (3%) and the Part B liquid to Part A dry powder mixture at a ratio between approximately 0.38 and 0.50 (and preferably in the range between approximately 0.40 and 0.45), the Neat Paste is soft and workable enough to laminate further with an additional fiber fabric, like chopped strand mat (CSM), which makes it possible to produce larger-sized products. This form of composite has very thin section with very high fiber content—capable of exceeding 12% when considering the fibers mixed into the Neat Paste and the additional fibers contributed by the CSM. These processes and systems are similar to fiberglass lamination processes and systems—using similar labor skills and equipment. This process produces very lightweight, flexible, but strong composites. These are referred to as multi-walled composites because there are often several layers of CSM laminated into one or more layers of neat paste.

It should be understood that dolomite (decorative aggregates) or fillers can be added to this layer of Neat Paste for the purpose of bulking out the product wall or for decorative purposes. However, adding such fillers does add weight and can sometimes reduce the strength and/or durability of the overall composite and the final product. Fillers, compatible non-reactive ultra fine powders, such as a calcium carbonate, meta kaolin, or other alumina silicates, may also be added to adjust the viscosity of the mixture until a dough-like consistency is achieved. Then, at room temperature and atmospheric pressure conditions, the applied mixture is allowed to set.

Next, the Neat Paste is painted or otherwise applied (Step 520) onto the surface of the mold, the layer of the neat paste preferably having a thickness between 2 and 10 mm and defining two surfaces of the decorative product, one surface engaged with and shaped by the surface of the mold and an opposite, exposed surface not engaged with the surface of the mold. Preferably, application of the Neat Paste to the existing mold may be done manually or mechanically using a cold casting process by applying the mixed components to the mold surface in conventional manner.

Next, a layer of engineered fiber fabric is placed (Step 525) onto the layer of neat paste on the surface of the mold and then the layer of engineered fiber fabric is laminated (Step 530) into the neat paste by adding additional neat paste thereupon, the layer of neat paste having a final, combined thickness between approximately 3 and 8 mm. Steps 525 and 530 may be repeated multiple times, as determined at Step 535, to add a desired number of layers of engineered fiber fabric into the composite wall.

The exposed surface of the Neat Paste, now reinforced with one or more layers of engineered fiber fabric, is then finished (Step 550) to establish the desired thickness of the reinforced Neat Paste and to provide the exposed surface with a surface texture (if desired). The reinforced Neat Paste is then allowed (Step 555) to remain in the mold for a predetermined time period (T1) to enable the composite to reach an initial curing point. The working time is adjusted depending on the complexity of the end product being molded. The working time is typically twenty (20) minutes and the predetermined time period (T1) to enable the composite to reach an initial curing point is within about one (1) hour on large products, or as quickly as ten (10) minutes for smaller products. After the decorative article has reached the initial curing point, the decorative article is then removed (Step 560) from the mold. Optionally, one or both of the surfaces of the decorative article are then colored and finished (Step 565) after the decorative article has reached the initial curing point and been removed from the mold. The decorative article removed from the mold is then allowed to dry (Step 570) for a time period T2 to reach a final curing point. The time period (T2) may be anywhere from 3 to 10 days.

No humidity control is necessary in any of the above-mentioned steps. In addition, since the process is a cold-casting process, it does not require the use of a kiln to bake the finished product to cure or set the composite. It is, however, preferred that the casting process be done in a covered, well-ventilated location. The formed usable and/or ornamental article may vary in size, shape, design, color, and weight, as desired.

Turning now to FIG. 7, table 700 illustrates the relative percentages of components that make up the as assembled, pre-cured decorative article manufactured from the above, multi-walled process. As shown in table 700, in one preferred embodiment, the pre-cured decorative article includes: (i) between 45 and 55 by weight percent of CSA type III clinker (with a preferred by weight percentage of about 50.7%), (ii) between 8 and 9 by weight percent of calcium sulfate (with a preferred by weight percentage of about 8.9%), (iii) between 0.30 and 0.70 by weight percent of micro-fiber (with a preferred by weight percentage of about 0.5%), (iv) between 0.5 and 2.3 by weight percent of macro-fiber (with a preferred by weight percentage of about 0.8%), (v) between 0 and 1.5 by weight percent of color pigment (with a preferred by weight percentage of about 1.5%), (vi) between 24 and 28 by weight percent of water (with a preferred by weight percentage of about 26.8%), (vii) between 0 and 0.003 by weight percent of lithium salt (with a preferred by weight percentage of about 0.0013%), (viii) between 0.03 and 0.10 by weight percent of HPMC (with a preferred by weight percentage of about 0.04%), (ix) between 0 and 0.18 by weight percent of PC acid (with a preferred by weight percentage of about 0.13%), and (x) between 6 and 12 by weight percent of CSM mat (with a preferred by weight percentage of about 11.6%). Weight loss on drying represents the evaporation of the excess water not taken up in Hydration. When the water/binder ratios are kept between 0.38 and 0.50, the typical weight loss is typically between 2 and 5% weight drop over 10 days.

Turning now to FIG. 8, table 800 illustrates the relative percentages of components that make up the as assembled, pre-cured decorative article manufactured from the above, multi-walled process in which dolomite (decorative aggregate) has been added to the Neat Paste for decorative purposes. As shown in table 800, in one preferred embodiment, the pre-cured decorative article includes: (i) between 43 and 53 by weight percent of CSA type III clinker (with a preferred by weight percentage of about 47.3%), (ii) between 7 and 9 by weight percent of calcium sulfate (with a preferred by weight percentage of about 8.25%), (iii) between 0.25 and 0.70 by weight percent of micro-fiber (with a preferred by weight percentage of about 0.47%), (iv) between 0.5 and 2.3 by weight percent of macro-fiber (with a preferred by weight percentage of about 0.71%), (v) between 0 and 1.5 by weight percent of color pigment (with a preferred by weight percentage of about 1.35%), (vi) between 22 and 26 by weight percent of water (with a preferred by weight percentage of about 24.6%), (vii) between 0 and 0.003 by weight percent of lithium salt (with a preferred by weight percentage of about 0.0012%), (viii) between 0.03 and 0.08 by weight percent of HPMC (with a preferred by weight percentage of about 0.0420%), (ix) between 0 and 0.20 by weight percent of PC acid (with a preferred by weight percentage of about 0.123%), (x) between 4 and 10 by weight percent of CSM mat (with a preferred by weight percentage of about 6.1%), and (xi) between 20 and 30 by weight percent of dolomite (with a preferred by weight percentage of about 25.6%).

In view of the foregoing detailed description of preferred embodiments of the present invention, it readily will be understood by those persons skilled in the art that the present invention is susceptible to broad utility and application. While various aspects have been described herein, additional aspects, features, and methodologies of the present invention will be readily discernable therefrom. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

I claim:

1. A molded, decorative article having a fiber-reinforced geo-composite wall with a thickness of between 4-10 millimeters (mm), the fiber-reinforced geo-composite wall comprising: before curing, predominately 50-60 by weight % a mineral-based type III clinker, 28-32 by weight % water, and 8-11 by weight % hydration control agent, the combination of clinker, water, and hydration control agent forming a basic water-reactive rapid-setting cementious binder, the hydration control agent used for controlling curing time of the water-reactive rapid-setting cementious binder, 2-6 by weight % combination of micro-fibers and macro-fibers dispersed evenly within the water-reactive rapid-setting cementious binder, the micro-fibers being 3-6 mm in length and the macro-fibers being 7-25 mm in length, 0.03-0.16 by weight % combination of a rheology modifier, a polymer modifier, and a moisture retention agent, 0-0.33 by weight % combination of a dispersion agent and a water-reduction agent, and 0-1.5 by weight % color pigment, where the fiber-reinforced geo-composite wall, after curing, has a density between 1.5 and 2.0 grams per cubic centimeter ($g/cm^3$).

2. The molded, decorative article of claim 1 wherein, after curing, the thickness of the fiber-reinforced geo-composite wall is between 4-6 mm.

3. The molded, decorative article of claim 1 wherein the mineral-based type III clinker is predominantly calcium sulfoaluminate (CSA).

4. The molded, decorative article of claim 1 wherein the micro-fibers have a diameter between 2-20 microns.

5. The molded, decorative article of claim 1 wherein the hydration control agent includes one or more of anhydrite, calcium sulfate hemihydrate, and lithium carbonate.

6. The molded, decorative article of claim 1 wherein the combination of micro-fibers and macro-fibers dispersed evenly within the water-reactive rapid-setting cementious binder comprises 1.5-2 times more macro-fibers than micro-fibers.

7. The molded, decorative article of claim 1 wherein the combination of the rheology modifier, the polymer modifier, and the moisture retention agent comprises high performance hydroxypropyl methylcellulose (HPMC) with a mean viscosity above 200,000 Saybolt Seconds, Universal (SSU).

8. The molded, decorative article of claim 1 wherein the combination of the dispersion agent and the water-reduction agent comprises poly-carboxylic (PC) acid.

9. A molded, decorative article having a fiber-reinforced geo-composite wall with a thickness of between 4-10 millimeters (mm), the fiber-reinforced geo-composite wall comprising: before curing, predominately 45-55 by weight % a mineral-based type III clinker, 24-28 by weight % water, and 8-9 by weight % a hydration control agent, the combination of clinker, water, and hydration control agent forming a basic water-reactive rapid-setting cementious binder, the hydration control agent used for controlling curing time of the water-reactive rapid-setting cementious binder, 1-2 by weight % combination of micro-fibers and macro-fibers dispersed evenly within the water-reactive rapid-setting cementious binder, the micro-fibers being 3-6 mm in length and the macro-fibers being 7-25 mm in length, 0.03-0.10 by weight % combination of rheology modifier, polymer modifier, and moisture retention agent, 0-0.18 by weight % combination of dispersion agent and water-reduction agent, 0-1.5 by weight % color pigment, and 6-12 by weight % engineered fiber fabric laminated into the fiber-reinforced geo-composite wall before curing, where the fiber-reinforced geo-composite wall, after curing, has a density between 1.5 and 2.0 grams per cubic centimeter ($g/cm^3$).

10. The molded, decorative article of claim 9 wherein, after curing, the thickness of the fiber-reinforced geo-composite wall of the molded, decorative article is between 4-6 mm.

11. The molded, decorative article of claim 9 wherein the mineral-based type III clinker is predominantly calcium sulfoaluminate (CSA).

12. The molded, decorative article of claim 9 wherein the micro-fibers have a diameter between 2-20 microns.

13. The molded, decorative article of claim 9 wherein the hydration control agent includes one or more of anhydrite, calcium sulfate hemihydrate, and lithium carbonate.

14. The molded, decorative article of claim 9 wherein the combination of micro-fibers and macro-fibers dispersed evenly within the water-reactive rapid-setting cementious binder comprises 1.5-2 times more macro-fibers than micro-fibers.

15. The molded, decorative article of claim 9 wherein the combination of rheology modifier, polymer modifier, and moisture retention agent comprises high performance hydroxypropyl methylcellulose (HPMC) with a mean viscosity above 200,000 Saybolt Seconds, Universal (SSU).

16. The molded, decorative article of claim 9 wherein the combination of dispersion agent and water-reduction agent comprises poly-carboxylic (PC) acid.

17. The molded, decorative article of claim 9 wherein the engineered fiber fabric is a random, open weave chopped strand mat (CSM) produced from a multi-strand assembled roving.

18. The molded, decorative article of claim 1 wherein the fiber-reinforced geo-composite wall further comprises dolomite or decorative aggregate.

19. The molded, decorative article of claim 9 wherein the fiber-reinforced geo-composite wall further comprises dolomite or decorative aggregate.

* * * * *